United States Patent [19]

Fannin et al.

[11] Patent Number: 4,757,884
[45] Date of Patent: Jul. 19, 1988

[54] HYDRAULIC DAMPER FOR VEHICLE SUSPENSION WITH WIDE RANGE OF TWO-STAGE DAMPER CURVES

[75] Inventors: Wayne V. Fannin, Xenia; Frank M. Fenton, Clayton, both of Ohio

[73] Assignee: General Motors Corporation, Detroit, Mich.

[21] Appl. No.: 5,290

[22] Filed: Dec. 16, 1986

Related U.S. Application Data

[63] Continuation of Ser. No. 717,641, Mar. 29, 1985, abandoned.

[51] Int. Cl.⁴ .................................................. F16F 9/348
[52] U.S. Cl. ........................................ 188/319; 137/493.8; 137/614.19
[58] Field of Search ............... 188/319, 285, 299; 137/493.8, 493.9, 614.19, 614.2; 267/127; 280/714

[56] References Cited

U.S. PATENT DOCUMENTS

| | | | |
|---|---|---|---|
| 2,351,662 | 6/1944 | Christofel | 188/319 |
| 2,950,785 | 8/1960 | Pastriquin | 188/319 |
| 3,420,341 | 1/1969 | Keehn, II | 188/319 |
| 3,528,531 | 9/1970 | Schweller et al. | 188/319 |
| 3,827,538 | 8/1974 | Morgan | 188/319 |
| 4,183,509 | 1/1980 | Nishikawa et al. | 188/319 X |
| 4,298,102 | 11/1981 | Nishikawa et al. | 188/319 |
| 4,561,524 | 12/1985 | Mizumukai et al. | 188/319 |

FOREIGN PATENT DOCUMENTS

| | | | |
|---|---|---|---|
| 771910 | 4/1957 | United Kingdom | 188/319 |
| 778282 | 7/1957 | United Kingdom | 188/319 |

Primary Examiner—George E. A. Halvosa
Attorney, Agent, or Firm—Charles R. White

[57] ABSTRACT

A family of two-stage rebound damping performance curves is provided by rotating a selector plate within the damper piston to a number of selected positions to control orifice selection to a centralized blow off passage to thereby control the rate of oil flow through the piston during rebound.

2 Claims, 2 Drawing Sheets

HYDRAULIC DAMPER FOR VEHICLE SUSPENSION WITH WIDE RANGE OF TWO-STAGE DAMPER CURVES

This is a continuation of application Ser. No. 717,641, filed on Mar. 29, 1985, now abandoned.

This invention relates to hydraulic dampers and more particularly to new and improved piston valving selectively providing a wide range of damping performance curves each with a two-stage operation.

Prior to the present invention, various hydraulic dampers, i.e. shock absorbers and suspension struts have been engineered with selectively variable orificing to control oil flow through the piston as it strokes in the cylinder tube to thereby control the action of the associated vehicle suspension springs. Generally such dampers involve costly and relatively complex blow off valving and controls and do not meet requirements for wide ranged two-stage operation. In contrast to such prior dampers, the present invention provides new and improved variable valving and control system which involves minimum change to widely used piston valving to provide a family of performance curves with knee-type two-stage operation so that the ride is relatively stiff at predetermined low frequency damper operation and moderated at higher frequencies to provide relative softer ride.

More particularly this invention provides a new and improved piston assembly for a hydraulic damper incorporating a rotatable selector plate operatively mounted on an orifice plate assembly. The orifice plate assembly includes a main body or piston plate with rebound and compression flow passages. The rebound flow passages in the orifice plate assembly includes a sized spill way, fluid receiving pockets having radial inner "bow tie" fluid receiving pocket and an axial flow primary orifice with a centralized blow off valve which establishes the knee or break point of the performance curves in rebound operation. The orifice plate assembly has intake passages adjacent the periphery of the orifice plate used in rebound and compression operation. The selector plate has radially disposed internal pockets on the inner surface thereof providing flow control orifices connecting selector plate windows with the intake passages in the orifice plate under certain operating conditions. The selector plate is turned in response to controls to various rotated positions to register and select spillways and orifices sized to further control the flow through the piston and thereby the resistance to piston stroking action within the cylinder tube. These spillways and orifices connect into a center passage controlled by blow off valving which opens at predetermined points (frequencies in cycles/min. vs. force level in Newtons) to modulate the damping force as operating frequency increases. This invention provides a selection of variable capacity flow passages which hydraulically are in parallel with the primary flow passages in the orifice plate controlled by the blow off valve. With such selected capacity bypass orifice construction, the knee of the performance or damping curve can be varied and moved to chosen points for controlling piston velocity and suspension spring damping during rebound. Compression is controlled through an intake valve in the orifice plate, a covering intake valve disk and an intake spring construction.

In a preferred embodiment of this invention, selector plate rotation is controlled through a rotatable shaft extending in a hollow piston rod from an internal or external actuator. If desired, the selector plate can be rotated to a position in which the variable orificing is provided by a sized spillway with minimized flow capacity. With this selection, the flow restriction through the piston is high and resistance to piston movement is high in the rebound mode of operation. In any event with high flow restriction, piston velocities are reduced to provide for a stiff or hard ride that may be desired under certain vehicle operating conditions such as high speed cornering. At a predetermined force level the blow off valve opens to modulate the stiff ride but there is still quick response and reduced vehicle roll as compared to available intermediate and soft ride performance curves. When rotated to a second or intermediate position, the orifice size is increased for medium or intermediate rebound damping action and flow through the piston is increased. At a predetermined force level the blow off valve again opens to modulate the intermediate rebound control. Under such intermediate condition, the resistance of the fluid within the damper to piston stroking in rebound is reduced as compared to the hard ride selection. With reduced resistance, piston velocity is increased and the ride is resultantly softer to provide a second stepped operating curve.

In a third position or setting, the orifice size is large and optimized for soft ride so that spring damping characteristics of the shock absorber are reduced. The blow off valve opens at higher frequency so that the two-stage performance is further separated from the hard and intermediate ride curves to provide a selected limit to the softer boulevard type ride. With all of these selected orifice settings, the damper converts rebound motions into heat at selected rates so that road bumps are cushioned and damped as desired by the vehicle operator.

These and other features, objects and advantages of this invention will be more apparent from the following detailed description and drawing in which.

Figure 1:
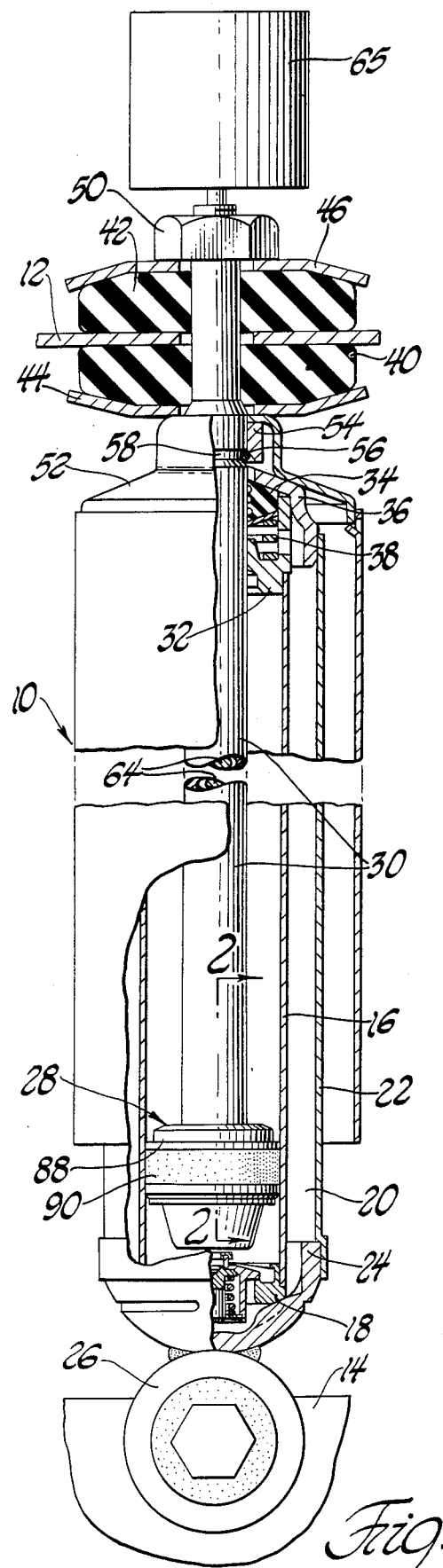
FIG. 1 is an elevational view partially in cross-section of a hydraulic damper according to this invention.
Figure 2:
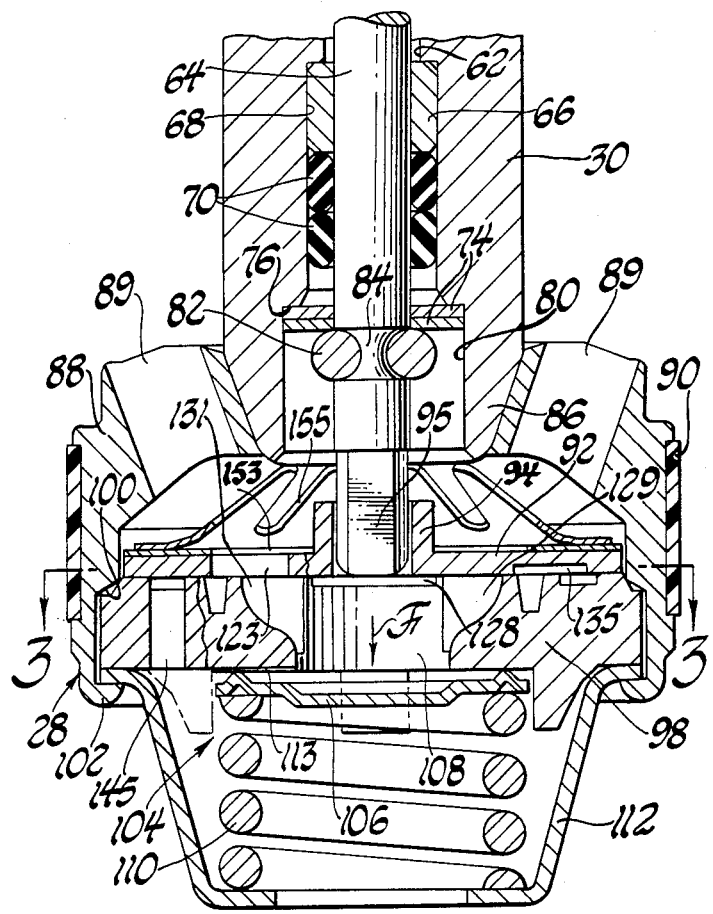
FIG. 2 is a cross-sectional view taken generally along sight lines 2—2 of FIG. 1 to show the valving of the piston assembly of this invention.

Turning now in greater detail to the drawings, there is shown in FIG. 1 a hydraulic, double-acting damper 10 operatively mounted between sprung and unsprung components of the vehicle here represented by an upper support plate 12 connected to the vehicle bodywork and a lower control arm 14 which is mounted to a steering knuckle and road wheel assembly. The damper 10 incorporates an elongated oil-filled cylinder tube 16 having a conventional base valve 18 secured in the lower end thereof which controls the passage of oil between the cylinder tube and a surrounding oil reservoir 20 formed between the cylinder tube and a reservoir tube 22. The reservoir tube 22 is closed at its lower end by a base cup 24 on which the base valve 18 is seated. A lower mount 26 welded to the exterior of the base cup provides conventional connection to the control arm 14.

A valved piston assembly 28 and connected hollow piston rod 30 are operatively mounted for linear stroking movement in the cylinder tube during shock absorber operation. Piston rod 30 extends upwardly from the piston assembly 28 through a conventional rod guide 32 mounted in the upper end of the cylinder tube. The piston rod further extends through an annular elastomeric seal 34 and through a cup-like seal cover 36 whose peripheral flange fits into and is welded to the upper end of the reservoir tube 22. A helical spring 38 seated on the rod guide and disposed around the piston rod yieldably holds the seal against the inner surface of the seal cover 36. The upper end of piston rod 30 extends through a pair of elastomeric mounting disk 40, 42 and the surrounding backing plates 44, 46 disposed on opposite sides thereof to sandwich the support plate therebetween. A nut 50 threadedly received on the end of the piston rod seats against disk 46 and holds the elastomeric disks in compression as shown in FIG. 1.

A cup-like upper cover plate 52 through which piston rod 30 extends is connected to the piston rod immediately below backing plate 44 by a cylindrical retainer 54 and a cooperating snap ring 56 received in a groove 58 in rod 30. The elastomer mounting disks 40, 42 being effectively trapped between the upper and lower plates 46, 44 isolate the piston rod from the vehicle body as shown in FIG. 1 The piston rod 30 has a central bore 62 for receiving an elongated actuator rod or shaft 64 that extends therethrough.

The actuator rod, driven by suitable motor 65 which may be external as shown or internal as described in Ser. No. 588,571, filed Mar. 12, 1984 U.S. Pat. No. 4,620,620, and assigned to the assignee of this invention and hereby incorporated by reference, is operatively connected to valving in the piston assembly described below.

As shown, a lower end portion of this rod is rotatably mounted in a cylindrical bearing 66 which is press-fitted within a small diameter counterbore 68 in the lower end of piston rod 30. 0-ring seals 70 fitted around the actuator rod 64 below bearing 66 contact the walls of the counterbore to block the passage of shock absorber oil through the central bore 62 to the exterior of the damper. The actuator rod is retained in the central bore 62 of the piston rod by washers 74 seated against end wall 76 of a larger diameter counterbore 80 formed in the piston rod 30 and by a stop ring 82 fitted into a transverse annular groove 84 in the actuator rod 64 at the bottom side of washer 74. With such construction, the rod 64 cannot inadvertently be withdrawn from the piston rod 30.

Figure 6:
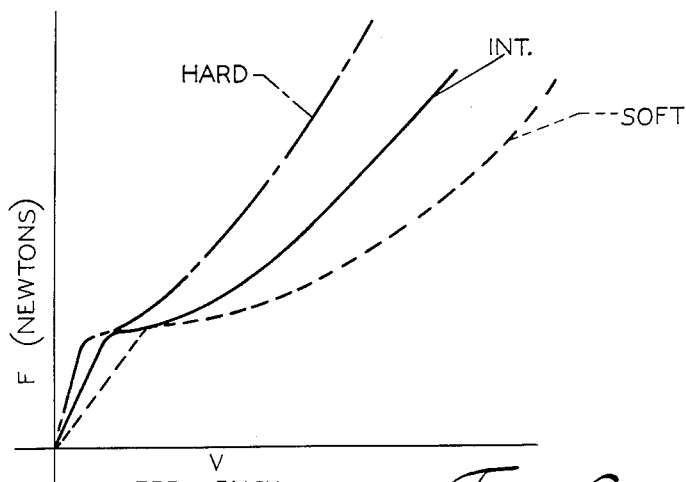
FIG. 6 are performance curves illustrating operation of the invention.

The inner end 86 of piston rod 30 is welded or otherwise fastened to a cylindrical shell-like main body 88 of the piston assembly 28. This main body has upper flow passages 89 therein and is peripherally bounded by a skirt 90 of Teflon or other suitable plastics material providing low friction sliding engagement with the inner wall of the cylinder tube 16. Mounted for axial rotational movement within the confines of main body 88 of the piston assembly 28 is a rotatable orifice selector plate 92 having an upstanding neck 94 mounted for up and down sliding movement on the flattened lower end 95 of rod 64 (part of plate 92 is shown out of position for illustration purposes). In addition to the rotatable orifice selector plate 92, the main body 88 of piston assembly 28 houses an orifice plate assembly comprising a cylindrical, relatively thick, fixed orifice plate 98. The orifice plate is peripherally secured in the main body 88 of the piston between an inner annular locator shoulder 100 and an inwardly coined lower annular end 102. A blow off valve assembly 104 comprised of a relatively flat valve plate 106 is spring-biased against the bottom of the orifice plate 98 to close central orifice plate opening 108 by helical spring 110. This spring is mounted in hat-shaped cage 112 retained in position by the coined end 102 of the piston body. A leak path 113 in the orifice plate can be provided across the valve plate to provide the first stage to the knees or bends of the operating curves of FIG. 6 At a predetermined pressure level the valve plate 106 is deflected downwardly in response to the forces of hydraulic fluid F thereon through passages 89 in rebound stroke. This opens the central opening or passage 108 in the orifice plate to establish the modulation from the knee joint of the operating curve to thereby control fluid flow through the piston under certain operating conditions as illustrated by the curves of FIG. 6.

The selector plate 92 is rotatably mounted within the cavity of the main body 88 of the piston by rotation of rod 64 through the motor 65. This plate has diametrically opposed arced intake windows 121, 123 (see FIGS. 3, 4 and 5) which can be rotated into registry with corresponding arced restricted flow spillway pockets 125, 127 in the orifice plate or the increased flow "bow tie" pockets 129, 131 also in the orifice plate for controlling the flow of shock absorber fluid through piston. The spillway pockets have arcuate low wall dams 125', 127' which cooperate with the bottom surface of the selector plate to form the radial flow restricted passage such as passage 128 in FIG. 4A which provides the hard ride setting. The bottom or interface side of the selector plate 92 is formed with two sets of shallow rectangular pockets 133, 135, 137, 139 which form radial flow control orifices that can be positioned by rotation of the selector plate to hydraulically connect the intake windows 121, 123 with the outer peripheral flow or intake passage 141, 143, 145, 147 in the orifice plate. Selector plate rotation is limited by roll pin 151 carried by the orifice plate which rides in window 123 in the selector plate. The contact of the pin 151 with the opposite ends of window 123 determines register of the passages with selector opening. The registry of the spillway pockets with windows 121, 123 illustrated by FIG. 3 can be through other internal stops or by using a suitable stepping type drive motor.

By rotating the selector plate to selected positions by motor 65, various combinations of flow control orifices can be chosen to set the two stage rebound damping characteristics of the shock absorber to meet the operator's requirements and demands. For example, if the selector plate 92 is rotated to the FIG. 3 position in which selector plate windows 121, 123 uncovers the spillway pockets 125, 127 in the orifice plate, rebound damper oil flowing through the upper passages 89 can flow through the restricted spillway passage such as passage 128 and the leak path 113 to generate the damping force illustrated by the two stage hard ride curve of FIG. 4. The valve plate "pops off" at predetermined set pressure to establish the two stage operation with effective modulation of the resistance force offered by this valve setting. With this selection the hydraulic damper has highest damping force for quick response ride with reduced roll desired for sports car performance.

Figure 3:
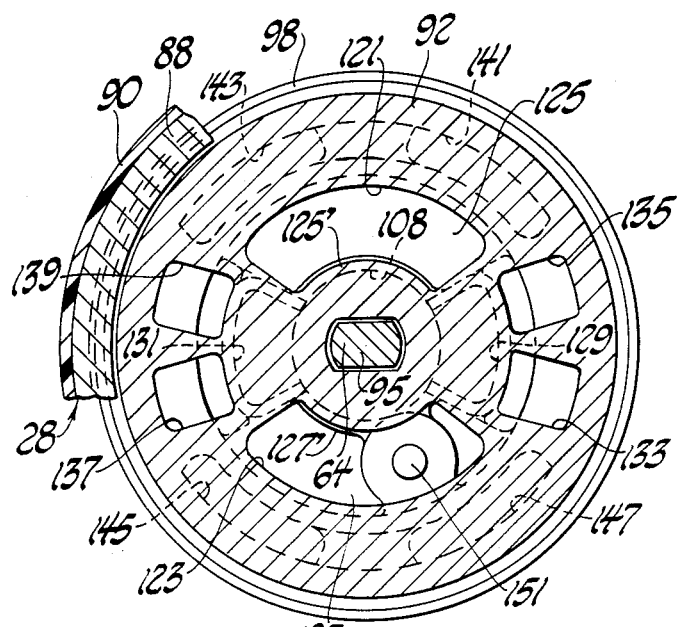
FIG. 3 is a cross-sectional view taken generally along sight lines 3—3 of FIG. 2 to show the selector plate and orifice plate relatively rotated to one of a plurality of operating positions for controlling fluid flow through the piston assembly for hard ride operation during rebound (part of the selector plate is shown out of position).
Figure 4:
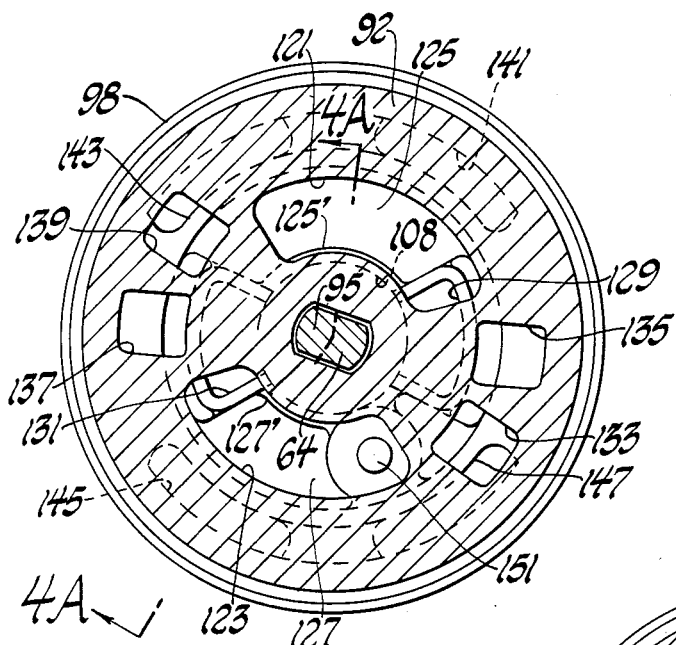
FIG. 4 is a cross-sectional view similar to the view of FIG. 3 illustrating further relative rotation of the selector and orifice plates for intermediate operation.
Figure 4A:
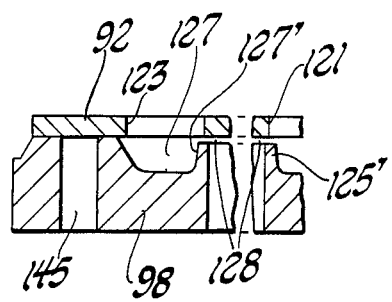
FIG. 4A is a fragmentary cross-sectional view of a portion of the selector and orifice plate taken generally along line 4A—4A of FIG. 4.

In the event that the operator desires an intermediate ride, the selector plate 92 is rotated counterclockwise from the FIG. 3 position until the selector plate intake windows 121, 123 are partially opened to the bow tie pockets 129, 131 as shown in FIG. 4. There is still flow through the restricted passage 128 to the valve plate 106 which blows off as described above and through the radial pockets 133, 139 into the intake passages 147 and 143 respectively. Accordingly, the restriction through the piston has been increased for the rebound stroke. There is still two stage operation with the knee of the intermediate curve moved to the right of that for the hard ride curve as shown in FIG. 4. In this condition, the resistance to suspension spring action is reduced with piston velocity on rebound stroke being increased as shown by the intermediate ride curve in FIG. 6.

Figure 5:
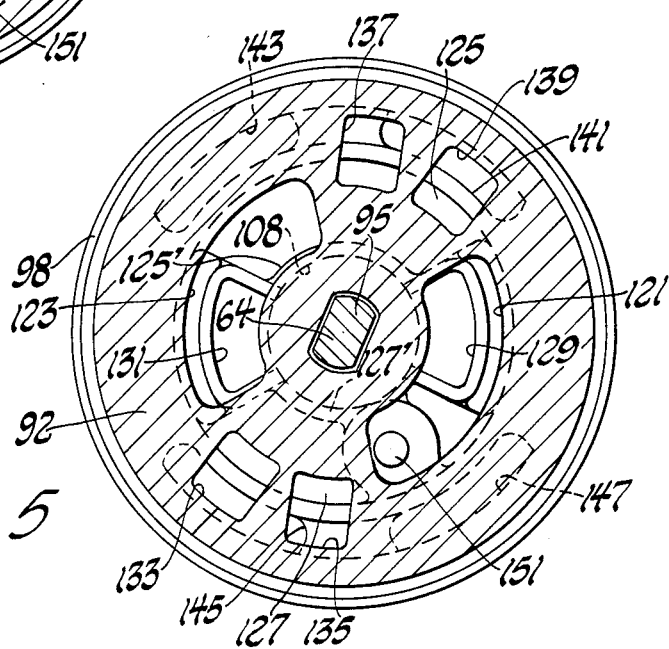
FIG. 5 is a cross-sectional view similar to the view of FIG. 3 illustrating the relative rotation of the selector and orifice plates to the soft ride position.

If a soft ride is desired the selector plate 92 may be selectively rotated to the FIG. 5 position so that intake windows 121, 123 are in full registry with the bow tie pockets 129 and 131. The radial pockets 133, 135, 137, 139 register with the intake passages 145, 141 as shown. With the restriction increasing in size, flow through the piston meets reduced resistance. The blow off valve 106 opens at higher frequency as shown by the soft ride curve of FIG. 6. With this action, the suspension spring rate is in effect, decreased as illustrated by the two stage soft ride curve for boulevard type ride.

On compression or jounce with the piston assembly moving downwardly, the fluid in the cylinder tube below the piston 28 will flow through the intake passages 141, 143, 145, 147 in the orifice plate to lift selector plate 92 from orifice plate 98 and deflect the conventional intake valve disc 153 against the biasing force of intake valve spring 155 to damp compression load. The spring 155 is a conventioanl wave spring which grounds on the inner wall forming the cavity of the main body of the piston. Compression flow then passes out of the piston.

While this invention shows three different selected two stage control operations, others can now be readily provided so that flow rates through the piston on rebound can be further varied for further tailoring of shock absorber or suspension strut action.

The embodiments of the invention in which an exclusive property or privilege is claimed are defined as follows:

1. A hydraulic damping unit providing a family of damping curves each having at least two stages for controlling the spring action of vehicle suspension springs comprising a cylinder tube having a hydraulic fluid therein, a piston mounted for linear stroking movement in said cylinder tube and hydraulically separating said cylinder tube into first and second chambers, valve means in said piston for controlling the flow of hydraulic fluid between said chambers through said piston, a piston rod extending from said piston to the exterior of said damping unit, an actuator having a rotatable output extending in said piston rod, said valve means comprising an orifice plate fixed in said piston, a selector plate operatively connected to said actuator output for turning said selector plate to predetermined positions, said selector plate having window means therein for selecting and varying hydraulic fluid flow paths through said orifice plate, said orifice plate having a first flow passage extending axially through the center thereof, a blow off valve element operatively disposed beneath said orifice plate and spring means associated therewith for controlling the flow of hydraulic fluid through said first flow passage and movable to a position whereby said first flow passage is sufficiently opened to establish a second stage of each of said damping curves, said orifice plate having first and second arcuately disposed fluid receiving pocket means radially outwardly of said first flow passage, a first of said pocket means having dam means at the radially inner end thereof cooperating with said selector plate to provide a radially extending flow restrictive passage interconnected to said first flow passage, a second of said pocket means having a relatively open fluid passage means at the radial inner end thereof connected to said first flow passage, said selector plate being rotatable by said actuator whereby said window means is only opened to said first pocket means allowing the radial flow into said first flow passage at a first flow rate to establish a first of said spring damping curves and subsequently rotatable to another position whereby said window means additionally opens to said second pocket means allowing additional radial flow into said first flow passage to establish a second flow rate and a second of said spring damping curves, said orifice plate having secondary axial flow path means radially outwardly of said first flow passage and having discrete fluid-receiving recesses in the lower face of said selector plate to effect the outward radial flow of said fluid from said first pocket to said secondary axial flow path means in response to rotation of said selector plate to a predetermined position whereby the spring damping characteristics of said hydraulic damping unit provide a third of said two-stage damping curves.

2. A hydraulic damping unit for controlling the spring action of vehicle suspension springs in jounce and rebound comprising a cylinder tube having a hydraulic fluid therein, a piston mounted for linear stroking movement in said cylinder tube and hydraulically separating said cylinder tube into first and second chambers, valve means in said piston for controlling the flow of hydraulic fluid between said chambers, a piston rod extending from said piston to the exterior of said damping unit, an actuator extending in said piston rod, said valve means comprising an orifice plate fixed in said piston, a selector plate operatively connected to said actuator rod and mounted for turning movement on said orifice plate, said selector plate having a window therein for selecting a flow path through said orifice plate, said orifice plate having a first flow passage extending through the center thereof and operatively covered by said selector plate blocking the axial flow of fluid therethrough, a blow off valve plate for controlling the flow through said first flow passage disposed beneath said orifice plate, spring means for urging said blow off valve plate into sealing engagement with said orifice plate to yieldably block said first flow passage, said orifice plate having first and second arcuately disposed pocket means extending radially outwardly from said first flow passage, said first of said pocket means having radial inner dam means cooperating with said selector plate providing a flow restrictive passage interconnected to said first flow passage, said second of said pocket means having a larger opening into said first flow passage as compared to said first of said pocket means, said selector plate being rotatable by said actuator whereby said window is only opened to said first pocket means allowing radial flow of hydraulic fluid into said first passage at a first flow rate to establish a first spring damping rate and subsequently rotatable to another position whereby said window additionally opens into said second pocket means allowing additional radial flow of hydraulic fluid into said first flow passage to establish a second flow rate to thereby vary the spring damping characteristic of said hydraulic damping unit, a secondary axial flow path through said orifice plate located outwardly of said first flow passage, said selector plate having discrete recesses in the lower face thereof to effect the outwardly radial flow of hydraulic fluid from said pocket means to said secondary axial flow path in response to rotation of said selector plate to a predetermined position whereby the spring damping characteristics of said hydraulic damping unit are further modified.

* * * * *